US012307536B2

(12) United States Patent
Chen et al.

(10) Patent No.: US 12,307,536 B2
(45) Date of Patent: May 20, 2025

(54) SYSTEMS AND METHODS FOR AUTOMATED STAGING AND CAPTURE OF REAL ESTATE NEGOTIATIONS

(71) Applicant: PROLOGIS, L.P., San Francisco, CA (US)

(72) Inventors: Christianne C. Chen, San Francisco, CA (US); Christina Jackson, San Francisco, CA (US); Tim Brandt, Denver, CO (US); Syed Ibrahim, Denver, CO (US); Kendra Cislo, Denver, CO (US); Erik Stock, Denver, CO (US)

(73) Assignee: PROLOGIS, L.P., San Francisco, CA (US)

( * ) Notice: Subject to any disclaimer, the term of this patent is extended or adjusted under 35 U.S.C. 154(b) by 724 days.

(21) Appl. No.: 16/903,288

(22) Filed: Jun. 16, 2020

(65) Prior Publication Data

US 2021/0390647 A1 Dec. 16, 2021

(51) Int. Cl.
*G06Q 50/18* (2012.01)
*G06F 16/25* (2019.01)
(Continued)

(52) U.S. Cl.
CPC ......... *G06Q 50/188* (2013.01); *G06F 16/258* (2019.01); *G06Q 10/107* (2013.01);
(Continued)

(58) Field of Classification Search
None
See application file for complete search history.

(56) References Cited

U.S. PATENT DOCUMENTS 6,879,997 B1  4/2005 Ketola et al.
10,810,361 B1 * 10/2020 Venkatraman ...... H04L 63/0421
(Continued)

FOREIGN PATENT DOCUMENTS

JP  2017228098 A  12/2017
JP  2018169855 A  11/2018
JP    6670406 B1   3/2020

OTHER PUBLICATIONS

G. Visinari and A. Groza, "Building an E-contract management system using Google Docs," 2011, 2011 IEEE 12th International Symposium on Computational Intelligence and Informatics (CINTI), pp. 225-230 (Year: 2011).*

(Continued)

*Primary Examiner* — Sarah M Monfeldt
*Assistant Examiner* — Michael J. Monaghan
(74) *Attorney, Agent, or Firm* — Perkins Coie LLP

(57) ABSTRACT

The present disclosure is directed to systems and methods for intelligently staging, capturing, and facilitating real estate negotiations. In one example aspect, a proposal may be submitted by a first party. The proposal may be locked to capture the state of the proposal terms at that point in time. The proposal may also be cloned, wherein the cloned proposal may be editable by a second party. The system may provide intelligent suggestions to include in the counter-proposal to the second party based on historical transactional data related to the first party, property characteristics, and/or current market data. The intelligent suggestions may be approved and integrated into the cloned proposal. Once the cloned proposal is updated accordingly, the cloned proposal with the updated terms may become a counter-proposal that is then transmitted back to the first party. The system may then receive an acceptance or rejection indication from the first party.

20 Claims, 8 Drawing Sheets

(51) Int. Cl.
  *G06Q 10/107* (2023.01)
  *G06Q 10/1093* (2023.01)
  *G06Q 30/0204* (2023.01)
  *G06Q 50/16* (2024.01)
(52) U.S. Cl.
  CPC ..... *G06Q 10/1095* (2013.01); *G06Q 30/0205* (2013.01); *G06Q 50/16* (2013.01)

(56) References Cited

U.S. PATENT DOCUMENTS

| | | | |
|---|---|---|---|
| 2004/0054606 A1 | 3/2004 | Broerman | |
| 2007/0260996 A1* | 11/2007 | Jakobson | G06F 40/197 715/255 |
| 2010/0106651 A1 | 4/2010 | Tate | |
| 2012/0072859 A1* | 3/2012 | Wang | G06V 30/40 715/764 |
| 2012/0185762 A1* | 7/2012 | Ozer | G06F 40/197 715/255 |
| 2014/0164255 A1* | 6/2014 | Daly | G06Q 10/0631 705/80 |
| 2014/0244346 A1* | 8/2014 | Silberman | G06Q 50/16 705/7.29 |
| 2014/0244421 A1 | 8/2014 | Porat et al. | |
| 2016/0071178 A1 | 3/2016 | Perriello et al. | |
| 2016/0232629 A1 | 8/2016 | Allison et al. | |
| 2017/0061352 A1* | 3/2017 | Kogut-O'Connell | G06Q 50/18 |
| 2017/0109655 A1* | 4/2017 | Miyazaki | G06N 5/022 |
| 2018/0053265 A1 | 2/2018 | Lyon | |
| 2018/0260371 A1* | 9/2018 | Theodore | G06F 40/186 |
| 2018/0268506 A1* | 9/2018 | Wodetzki | G06N 5/046 |
| 2019/0266196 A1* | 8/2019 | Boyce | G06Q 50/188 |
| 2019/0266231 A1* | 8/2019 | Banerjee | G06N 3/02 |
| 2020/0026916 A1* | 1/2020 | Wood | G06F 18/2178 |
| 2020/0043113 A1* | 2/2020 | DePalma | G06F 40/289 |
| 2020/0202256 A1* | 6/2020 | Chaudhari | G06N 20/20 |
| 2020/0226646 A1* | 7/2020 | Awoyemi | G06Q 50/188 |
| 2020/0226700 A1* | 7/2020 | Halasz | G06N 20/00 |
| 2021/0110102 A1* | 4/2021 | Kershner | G06F 3/04883 |
| 2021/0125297 A1* | 4/2021 | Doran | G06Q 50/18 |
| 2021/0271718 A1* | 9/2021 | Agarwal | G06F 16/2474 |

OTHER PUBLICATIONS

P. R. Krishna and K. Karlapalem, "Electronic Contracts," 2008, IEEE Internet Computing, vol. 12, No. 4, pp. 60-68 (Year: 2008).*
PCT/US20/41084 International Search Report and Written Opinion mailed Sep. 28, 2020, 9 pgs.
Extended European Search Report mailed Jan. 5, 2024 in European Patent Application No. 20940759.2, 8 pages.
Office Action mailed Apr. 2, 2024 in Japanese Patent Application No. 2022-577534, 14 pages, with English translation.
Office Action mailed Sep. 17, 2024 in Japanese Patent Application No. 2022-577534, 7 pages, with English translation.

* cited by examiner

SYSTEMS AND METHODS FOR AUTOMATED STAGING AND CAPTURE OF REAL ESTATE NEGOTIATIONS

TECHNICAL FIELD

The present disclosure is related to the fields of digital contract negotiations, machine learning and predictive analytics.

BACKGROUND

Contract negotiations are part of everyday business. But the way negotiations are handled by parties has largely remained unchanged over the last several decades. Many negotiations still occur face-to-face, which requires access to a physical space, making meeting times and logistics oftentimes inconvenient for at least one or more of the parties. Some negotiations have moved away from the face-to-face environment and toward technologically-mediated solutions, such as phone calls, shared documents, video conference meetings, texts, facsimile, and electronic mail. Although conducting negotiations by phone, video, texts, or via email does not require access to a physical meeting space, such negotiations still require that the parties exchange writings to memorialize agreed-upon terms, a process prone to confusion and error due to a lack of shared version control and organization. For example, a contract negotiation that is handled via email will typically involve numerous back-and-forth exchange among the parties, with each exchange resulting in a written proposal with updated terms. The receiving party is typically forced either to review the updated proposal side-by-side with the previous version to discern the proposed changes or to rely upon redlines from a word processing application. Throughout the negotiations, multiple versions of proposals may be created, with each iteration containing new or modified terms. Keeping track of each change at each negotiation cycle is cumbersome, inefficient, and often leads to confusion or lack of clarity on the agreed terms.

Furthermore, many negotiations involve more than one party. For instance, consider a lease contract negotiation, which involves a customer, customer's broker, a leasing officer, and a listing broker. A customer broker may discuss with his/her client (the customer) prior to submitting a proposal for a property location. The customer broker may then transmit the proposal to the leasing officer of the property location via email. The leasing officer may analyze the proposed terms, but before deciding whether to accept, reject, or propose a counter to the proposal, the leasing officer may consult internal budget, market, or other financial data, as well as the property manager to verify accuracy of the budgetary information, or its supervisor for direction. In consulting with the property manager or a supervisor, the leasing officer would transmit the proposal or pertinent portions thereof for their respective review. Based on the comparisons and internal discussions, the leasing officer prepares proposed counter-offer terms. Once a counter-offer is created, the counter-offer is transmitted back to the customer broker, the customer, or both, with a copy to the listing broker. Once the customer broker receives the counter-offer, the customer broker will discuss the proposed terms with the customer prior to accepting, rejecting or modifying the counter-offer. As part of the process, the broker forwards the counter-offer to the customer via email. This cycle repeats as many times as needed until the parties reach an agreement. However, during these negotiations, multiple versions of a contract and/or proposed deal terms are passed among different parties without a centralized location to view the negotiation progression. This style of negotiation is prone to error and inefficiency, as well as confusion, especially when new deal terms are proposed or conceded at certain steps in the negotiation process. Neither party is able to holistically visualize the progression of the negotiations when the negotiations are conducted via email, text, facsimile, phone, face-to-face, or other media. The modern-day norm of negotiation practice makes version control difficult to maintain and causes the history and progression of certain deal terms that may have been agreed upon or proposed earlier in the negotiation cycle to be forgotten.

Additionally, modern day negotiations are still conducted with imperfect or not easily accessible information. Parties often negotiate with one another with little to no data about the other party's historical business practices, certain deal terms that may be too high or too low, and/or current market trends. This typically results in redundant and unnecessary negotiation cycles, that delays the negotiation process, frustrates deal consummation, and wastes time for all parties.

Modern day contract negotiations are hampered by the face-to-face back and forth, version control issues, emails or similar exchanges between the parties, resulting in a chaotic and disorganized negotiation environment and process. Also, negotiations are laborious because people are operating on imperfect, incomplete, and disorganized information, or recollection, which often leads to ineffective and unnecessary multiple rounds of negotiations.

As such, there is an increased need for systems and methods that can address the challenges of modern-day negotiation practices, including the inefficiency and disorganization of negotiating via face-to-face, phone, text, facsimile, email, and/or other similar electronic or digital media, as well as the lack of access to holistic information regarding the parties, assets, and market involved in a negotiation.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
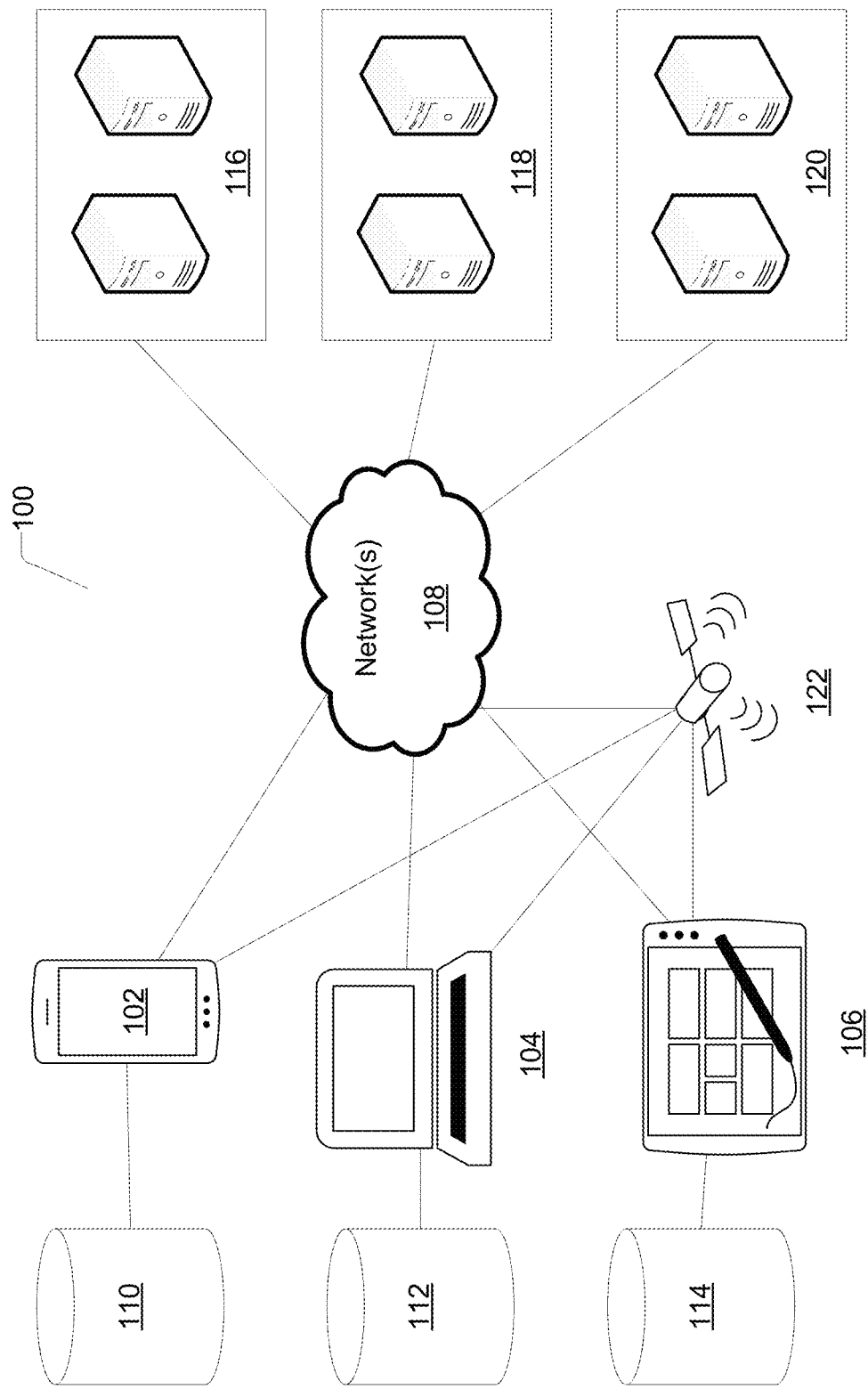
FIG. 1 illustrates an example of a distributed system for intelligently staging and capturing negotiations, as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods associated with intelligently staging, capturing, and facilitating the flow of negotiations. In one example, a proposal may be received from a first party by a system. The system may then present the proposal to a second party, wherein the presented proposal may be cloned. The version of the proposal received and presented by the first party may be "locked" to preserve data integrity and for reference by the second party. In an embodiment, the version of the proposal received may be copied or cloned. The version of the proposal may also be copied and edited by the second party. The locked version of the proposal may be presented in conjunction with the editable version of the proposal (e.g., side-by-side in a display). The editable version of the proposal may be amended by a second party to create a counter-proposal. Once the second party has finished editing the proposal with updated terms of the counter-proposal, the second party may indicate to the system that the counter proposal is ready to be transmitted back to the first party. The system may receive an approval confirmation from the second party, and the updated proposal terms become a bona fide counter-proposal that may be transmitted back to the first party. Upon receipt of the counter-proposal by the first party, the counter-proposal may be locked, cloned and/or made editable. If locked, the locked version of the counter-proposal may be displayed in conjunction with the cloned version of the counter-proposal. Similar to the functionality associated with receiving the first proposal, the locked counter-proposal may not be edited, whereas the cloned counter-proposal may be edited. Alternatively, if made editable or in the event of the cloned editable version, the first party may proceed to edit the counter-proposal terms, eventually creating a second counter-proposal to be transmitted back to the second party. In embodiments, the counter-proposal received by the first party may identify or flag one or more changed terms from the first party's proposal so that the first party can easily identify and focus its attention. This process may repeat as many times as necessary until both parties reach a mutual agreement. In another embodiment, a proposal that is based upon user-created content is received from a digital platform.

Once a proposal or counter-proposal is submitted by one party to the other, the version that was submitted may be locked to preserve historical reference. The locked versions of the proposals or counter-proposals may be chained together after each negotiation iteration. The visual presentation of the locked proposals may aid the parties to the negotiation in understanding the progression of the negotiations and understanding exactly which terms may have changed during the negotiations and when.

In another example aspect, the system may receive a request for a proposal. The request for proposal may be locked and cloned, similar to a proposal submission. The request for proposal may include relevant contact information, such as individual and company name, address, phone numbers, email, and customer identifier. The system may capture this information and compare the captured information against a database of contacts. In an alternative embodiment, this information may be requested, prompted, and/or verified by an intermediate entity or user. If a contact match is detected, the system may automatically update the contact's information within the contact database. The system may provide the request for proposal to a second party. In response to a request for proposal from a first party, the second party may voluntarily create an initial proposal for transmission in response to the request of the first party. Once the proposal is created and submitted, the system may deliver the proposal to the first party. The proposal may be locked and cloned, where the locked version of the proposal may not be edited (but is displayed for reference, e.g., to capture or memorialize the state of negotiations at that moment in time), and the cloned version may be edited. The first party may then proceed to edit the cloned version of the proposal. Once the first party is ready to transmit the updated version of the proposal, a preview pane may be automatically generated for the first party's review. Once the first party indicates approval, the system may capture the updated version of the proposal. The captured version of the updated proposal becomes the counter-proposal that is transmitted back to the second party.

During the course of the negotiations, any party may indicate acceptance of a proposal/counter-proposal. Once an acceptance is indicated by one party, the proposal terms may become locked, and the negotiation process may cease. In some aspects, the system may generate a preview pane and/or prompt the other party who transmitted the most recent proposal to confirm acceptance.

In some aspects, the systems and methods disclosed herein may provide intelligent assistance to the negotiating parties. For instance, a party submitting a proposal to purchase an asset may have entered an erroneous number (e.g., a typographical error) based on current market conditions. The system may flag this error and display an indication of the potential error and ask the party to confirm accuracy. In other examples, the data collected from the input may be compared against market data with a preset variance, and if the input data is outside of that preset variance, the system may flag this error and display an indication to the party, requesting the party to confirm accuracy. In other instances, a second party that receives a proposal from a first party may receive intelligent suggestions for counter-proposal terms based on the transaction history, and deal-flow characteristics and/or other characteristics of the first party (e.g., suggested rates, terms, concessions, transactional history, tenant industry, locale, etc.). Such intelligent suggestions during negotiations may improve the efficiency of the negotiation process and result in reduced usage of network resources.

Accordingly, the present disclosure provides a plurality of technical benefits including but not limited to: enabling more efficient use of electronic resources during negotiations; more efficient storage management, since each stage of the negotiation process is captured within the system (as opposed to each party having to manually download and save a copy of each proposal); and enabling computing devices to generate intelligent negotiation suggestions based on machine-learning and predictive analytics algorithms, among other examples.

FIG. 1 illustrates an example of a distributed system for intelligently staging and capturing negotiations. Example system 100 presented is a combination of interdependent components that interact to form an integrated whole for staging, capturing, and facilitating negotiations. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit proposals and counter-proposals related to a negotiation. Additionally, client devices 102, 104, and 106 may be configured to receive outside data related to transaction histories, market data, financial trends, etc. to train at least one machine learning algorithm. The client devices 102, 104, and 106 may then receive intelligent deal-term suggestions based on the trained machine learning algorithm(s) related to the proposals/counter-proposals. In aspects, a client device, such as client devices 102, 104, and 106, may have access to one or more data sources and/or databases comprising third-party market data, asset information (e.g., comparable property valuations, most current lease rate, etc.), past deal-flow history of the other negotiating party (e.g., time to respond to new proposal, terms most likely to negotiate, terms most likely to not negotiate, etc.). In other aspects, client devices 102, 104, and 106, may be equipped to receive broadband and/or satellite signals carrying proposal/counter-proposal information to be displayed on a display device, such as a client devices 102, 104, and 106. The signals/information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., smart watch), among other devices.

Client devices 102, 104, and 106 may be configured to run intelligent negotiation suggestion software that may be stored locally on the client device or run remotely via network(s) 108. For example, a client device may receive a signal from satellite 122 containing a particular negotiation suggestion related to a recent proposal received on the client device. The client device may receive the suggestion and subsequently store the suggestion locally in databases 110, 112, and/or 114. In alternative scenarios, the suggestion that is presented may be transmitted from a client device (e.g., client device 102, 104, and/or 106) via network(s) 108 to be stored remotely on server(s) 116, 118, and/or 120. A user may subsequently access the suggestion from a local database (110, 112, and/or 114) and/or external database (116, 118, and/or 120), depending on where the suggestion may be stored.

In some example aspects, the intelligent negotiation suggestion software running on client device(s) 102, 104, and/or 106 may be configured to receive updated data from various sources via network(s) 108 and/or satellite 122. For example, the intelligent negotiation suggestion software may comprise at least one machine learning or predictive analytics algorithm/model. The negotiation suggestion software may be configured to consistently receive updated market data, comparable asset information, transaction history related to negotiating parties, and previously rendered intelligent suggestions (and user decisions to approve or reject the intelligent suggestions), among other sources of data. The received data may be compiled into at least one dataset used to train the at least one machine learning or predictive analytics algorithm. The at least one machine-learning or predictive analytics algorithms (and models) may be stored locally at databases 110, 112, and/or 114 and/or externally at databases 116, 118, and/or 120. Client devices 102, 104, and/or 106 may be equipped to access these machine learning and predictive analytics algorithms and receive intelligent suggestions regarding real-time negotiations based on at least one machine-learning or predictive analytics model that is trained on a plurality of data, including but not limited to, past transaction history related to a negotiating party, asset valuation data (e.g., based on comparable and/or similarly-situated assets), current market conditions, predicted market conditions, etc. For example, if a first negotiating party frequently exchanges 1 month of free rent for an increase of 1 year in the length of a lease term, that first negotiating party's preferences may be captured and collected to train a machine-learning and/or predictive analytics model(s). The machine-learning and/or predictive analytics model(s) may then be used to automatically suggest similar terms for a counter-proposal that the second negotiating party may be preparing to send back to the first negotiating party. Such intelligent contract suggestions may allow the negotiating parties to reach agreement quicker, use less resources, and waste less time overall. In other example aspects, a certain customer that may be looking to lease commercial property may demonstrate a preference for certain amenities, geographies, office layouts, proximities to certain points-of-interest (e.g., distance from an international airport), term length, floor area, etc. The intelligent contract suggestion systems and methods described herein may implement at least one machine-learning or predictive analytics algorithm that is trained on a dataset reflecting a customer's preferences regarding amenities, geographies, office layouts, proximities, term duration, and size, among other factors. The systems and methods described herein may then automatically propose intelligent suggestions to negotiating parties based on the at least one machine learning or predictive analytics model trained on these various sets of data.

As described herein, a machine-learning (ML) model may refer to a predictive or statistical utility or program that may be used to determine a probability distribution over one or more character sequences, classes, objects, result sets or events, and/or to predict a response value from one or more predictors. An ML model may comprise or be inclusive of one or more predictive analytics algorithms. A model may be based on, or incorporate, one or more rule sets, machine learning, predictive analytics, a neural network, or the like. In examples, the ML models may be located on the client device, service device, a network appliance (e.g., a firewall, a router, etc.), or some combination thereof. The ML models may process user transaction and deal-flow history, as well as other data stores of user preferences (e.g., social media profiles) to determine which types of suggestions should be automatically presented to a negotiating party. Determining whether a certain suggestion should be presented may comprise identifying various characteristics of a user's transaction/deal-flow history and preferences, e.g., including at least an average response time. These transaction/deal-flow history data points may be referred to as negotiation metrics. For instance, based on a user's property search history or parameters or if a user has a social media profile that indicates that the user frequently travels to different locales or uses an airport, then the intelligent contract system described herein may determine that a different property asset should be presented to that user (e.g., through an intelligent suggestion prompting the other party to submit a counter-proposal based on the different property). This may be particularly relevant in the scenario of a negotiation for office space or in the residential setting. Rather than submit a counter-proposal based on the initial property in which a user may be interested, a counter-proposal proposing an entirely different property that more likely matches with the user's preferences (e.g., the new property may be closer to public transportation than the initial property) may be a more attractive proposal. Similarly, in a commercial negotiation context, if a certain broker frequently offers lower-than-normal proposals initially, the intelligent contract systems described herein may capture that pattern of behavior and suggest to the other negotiating party to increase the price of the property asset on counter-proposal, since the broker is likely to increase the price after subsequent cycles of negotiation. Based on an aggregation of data from, e.g., a customer's preferences, a broker's negotiating strategy, history, current market trends, comparable asset valuations, etc., at least one ML model may be trained and subsequently deployed to automatically suggest intelligent contract terms to include in a proposal/counter-proposal during a negotiation cycle, which may aid in reaching mutual agreement faster than otherwise.

The trained ML model may be deployed to one or more devices. As a specific example, an instance of a trained ML model may be deployed to a server device and to a client device. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals containing packets of information holding intelligent contract suggestions. In such examples, the ML model may be locally cached by the client device.

Because the client devices 102, 104, and 106 are constantly in communication with one another via network(s) 108 and satellite 122, real-time intelligent contract suggestions may be presented to one or more parties currently in negotiations. For instance, sudden market changes may prompt the intelligent contract system described herein to transmit a notification to a party to update a certain term in a counter-proposal. Specifically, a first party may have already transmitted a counter-proposal to a second party. Before the second party may respond to the counter-proposal, the first party may amend and submit a new counter-proposal and retransmit with updated terms, thereby revoking the first counter-proposal and replacing it with the updated terms. However, the initial counter-proposal from the first party is locked and stored, so the second party may review the changes between the initial counter-proposal and the new counter-proposal from the first party. Each proposal and counter-proposal submitted within the system is stored and locked to preserve the data integrity of each proposal and counter-proposal, allowing the capture of the flow of negotiations. Such real-time negotiations are available because of the interconnectedness of client device(s) 102, 104, and 106 with network(s) 108 and satellite 122.

Figure 2:
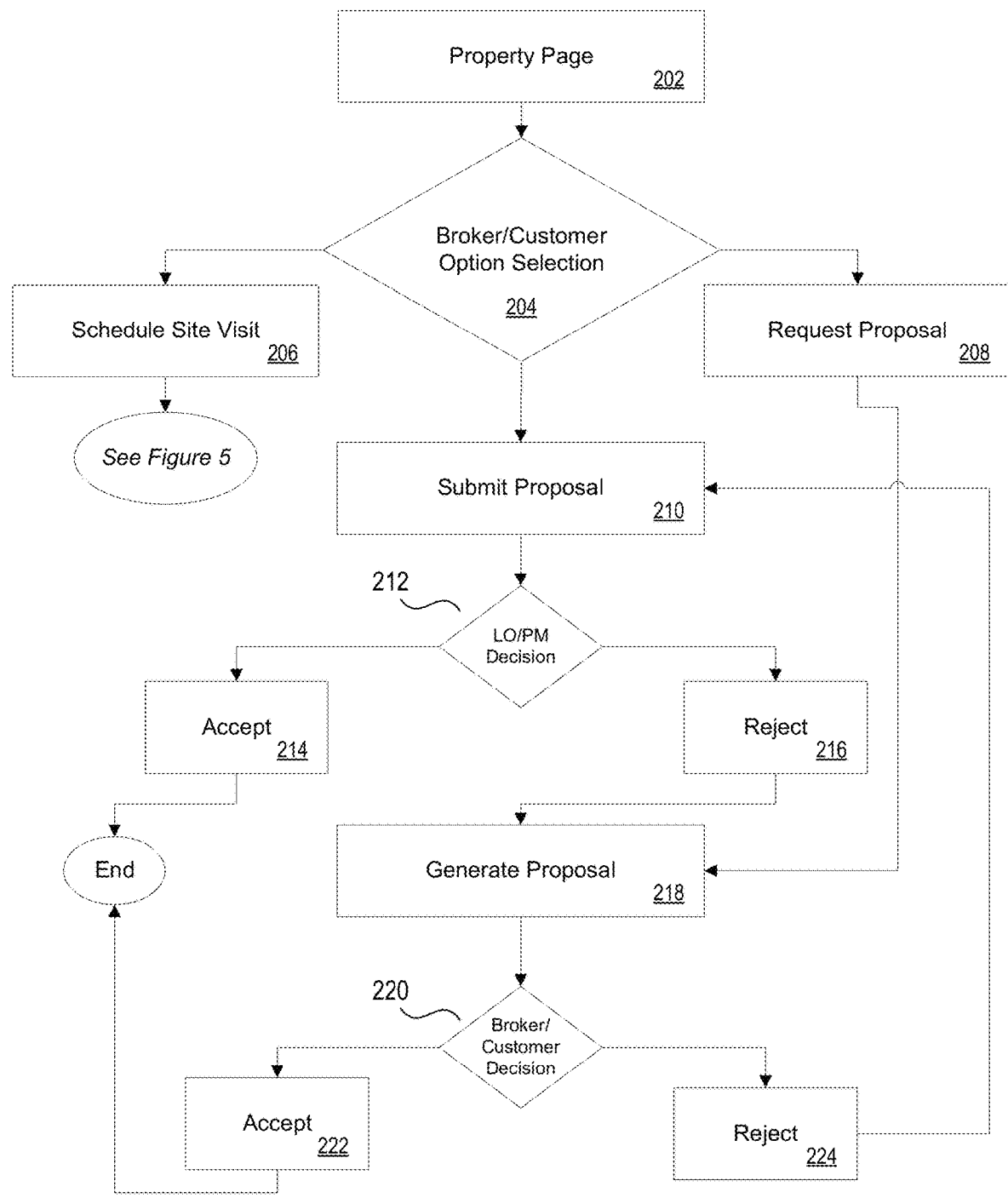
FIG. 2 illustrates an example method for intelligently staging, capturing, and facilitating negotiations, as described herein.

FIG. 2 illustrates an example method for intelligently staging and capturing negotiations, as described herein. The method 200 begins at block 202, where a property page 202 is displayed. On the property page, three choices are presented: schedule site visit 206, request proposal 208, and/or submit proposal 210. A selection of schedule site visit 206 will then cause the system to display certain prompts, indicating to the user to select a convenient day and time for a site visit, as well as provide calendar synchronization functionality. The scheduled site visit 206 is described in more detail with respect to FIG. 5.

A selection of request proposal 208 causes the system to present to the user a request proposal form with certain form fields. In some example aspects, the request for proposal may be already linked to a specific property location in which a user is interested. In that scenario, the request for proposal form may already be populated to indicate the specific property location. In other example aspects, the request for proposal form may not be tied to a certain property location but instead allow the user to enter specific criteria that the system may then receive, analyze, and use to provide an intelligent suggestion to the user regarding an available property. For instance, a user may input certain criteria regarding geographic location, floor area, amenities, proximity to points-of-interest (e.g., distance from major metropolitan area, distance from nearest international airport), term length, price, etc. The intelligent contract system described herein may receive these criteria and provide intelligent suggestions regarding candidate property locations. The property location candidates may be displayed to the user before the submission of the request for proposal, or, in some instances, the property location candidates may be displayed simultaneously with the submission of the request for proposal. If a particular candidate property location captures the interest of the user, then the user may subsequently submit a request for proposal based on that specific property location. The system may receive this subsequent request for proposal and link it to the user's earlier request for proposal. The system may then provide the first request for proposal (with no specific property location) and the second request for proposal (with the specific property location) to the other negotiating party, who may be a leasing officer, or persons who are responsible for the general geographic area. In other examples, a negotiating party (e.g., first party or second party) may comprise a group of designated individuals, wherein any of the designated individuals may perform actions within the system on behalf of the negotiating party. In yet other examples, the notification system of the intelligent contract system described herein may be configured to notify designated individuals that may be associated with the negotiating party.

Once the request for proposal is submitted, the system captures the request and provides it to the other negotiating party. The request for proposal may be locked and cloned. The locked version of the request for proposal may not be edited but may be displayed for reference. The cloned version may be edited by the other negotiating party to create a proposal. Once the request for proposal is locked and cloned, the system may generate an intelligent scenario with proposal suggestions for the other negotiating party (Generate Proposal 218). For real estate leasing transactions, the suggestions may include but are not limited to rent, term duration, commencement date, and rent concessions (e.g., number of months of free rent). The intelligent suggestions provided to the other negotiating party at block 218 may be based on at least one machine learning or predictive analytics model that is trained on historical transaction and deal-flow data related to the requesting party, similarly situated property locations, and current and future market data. The party receiving the intelligent suggestions through the scenario generator may approve or reject the suggestions, in whole or in part. Some suggested terms may be approved, but some suggested terms may be rejected. The system may receive these approval and disapproval indications as the user reviews the intelligent contract suggestions. The system may also store these approval and rejection indications as historical data that may be used to further train the at least one machine learning or predictive analytics model.

In other instances, a proposal may be generated at 218 manually by a user. The proposal may be generated in consultation with third-party market data and other relevant historical data that the intelligent contract system may provide the user.

Once a proposal is generated at 218, the proposal may be approved by the proposing party. The proposal may then be transmitted back to the requesting party (e.g., broker/customer) for a decision of accept 222 or reject 224. If the system receives an accept 222 indication, then the method is concluded, since both parties have agreed to the terms of the proposal. In some scenarios, after an accept 222 indication is received by the system, the system will prompt the proposing party to re-confirm his/her acceptance of the proposal. Alternatively, if the system receives a reject 224 indication, the method then proceeds to submit proposal 210, where the broker/customer will have an opportunity to submit a counter-proposal back to the other party (e.g., leasing officer (LO)).

At submit proposal 210, a party may transmit an initial proposal or a counter-proposal to the other party. In the initial proposal scenario, a party begins at the property page 202 and selects submit proposal. The submit proposal may be displayed to the user for the user to fill out. In some instances, the submit proposal form may be filled out manually by the user. The system may provide helpful third-party data sources to reference while filling out the proposal form. Additionally, if a user makes a typographical error in the proposal form by putting in an incorrect price (e.g., $1,000 vs. $10,000/month), the intelligent contract system may flag that error for the user. The error may be indicated to the user, and the user may either acknowledge the error and fix the number based on a suggested correction from the intelligent contract system, or the user may dismiss the error notification and proceed with the original entry.

In the counter-proposal scenario at block 210, the initial proposal (from the other party—LO) may be locked and cloned. The locked version may not be edited but may be displayed in conjunction (e.g., adjacent within a display) with the cloned and editable version of the initial proposal. The locked version of each proposal captures the stage of the negotiations at that point in time. Each subsequent counter-proposal is also locked and "daisy-chained" to the initial locked proposal to show the progression and evolution of the contract negotiations. The user (broker/customer in this example) may make edits to the cloned version of the proposal to then create a counter-proposal that will be transmitted back to the LO. In conjunction with the user making edits to the cloned version of the initial proposal, the intelligent contract staging and capturing system described herein may provide suggestions to the user, wherein the suggestions may comprise proposed terms for a counter-proposal. The intelligent suggestions for counter-proposal terms may be based on predictive analytics and/or at least one trained machine learning model that may be trained on historical transactional/deal-flow history related to the LO, similarly situated assets and valuations (in this example, property locations), current market trends, future market predictors, and other data sources relevant to providing intelligent counter-proposal term suggestions. The user may approve or disapprove of the suggestions, so the ultimate counter-proposal may comprise entirely of intelligent suggestions, a combination of intelligent suggestions and user-generated terms, or entirely of user-generated terms.

Additionally, the system may indicate changes between proposals. For instance, as the negotiation cycle continues, a chain of locked proposals may be displayed. The changes between the terms may be denoted by a change indicator (e.g., a red star or contrasting font color), so the user may easily be able to see where the changes are proposed. Change indicators may also be presented to the other negotiating party when a counter-proposal is received, indicating the changes between the initial proposal and the counter-proposal.

Once the counter-proposal is finalized at block 210, the counter-proposal may be transmitted to the other negotiating party (LO) for review. The LO may decide at decision block 212 whether to accept 214 or reject 216 the counter-proposal. If the LO accepts the counter-proposal, the method may conclude, as all parties have agreed to the terms of the proposal. As mentioned earlier, in some scenarios, following the accept 214 indication, the system may prompt the proposing party (in this case, the broker/customer) to re-confirm acceptance of the proposed terms. If the LO rejects the counter-proposal at block 216, then a new negotiation cycle may start, with the counter-proposal being locked and cloned. The LO may then edit the cloned version of the counter-proposal to create a new counter-proposal to transmit back to the broker/customer. The intelligent contract system described herein may provide intelligent suggestions related to the new terms that the LO may propose in the counter-proposal back to the broker/customer. This process may continue as many times as necessary until both parties reach a mutual agreement, and the system receives acceptance indications from all parties to the negotiation.

The method described in FIG. 2 may be applicable to other scenarios besides a negotiation for a lease of a property location. Indeed, any asset may be the subject of negotiations, and the same method steps described in FIG. 2 may apply. For example, rather than a lease for a property location, the asset at issue could be "employment," where the proposal and counter-proposal cycles are related to terms in a proposed employment contractor between a potential employee and an employer. In other examples, the asset may be a tangible object like a valuable, a car, a boat, etc. In yet other examples, the asset may be a "service" that one party may be able to provide to another party, and the terms of the "service" are the issue of negotiation. Regardless of the nature of the contract and the asset at issue, the methods of the intelligent contract system described herein may apply.

The method described in FIG. 2 may also apply for comparison of multiple proposals from various negotiating parties interested in the asset. The ML model can be applied to compare all offers and make suggestions in preparing counter-proposals to each proposal or counter-proposal. For example, a tenant solicits request for proposals from multiple land owners based on a set of criteria or a seller requests offers from multiple buyers and in each case, the platform allows concurrent negotiations. The ML model captures the data associated with these concurrent negotiations and is able to intelligently suggest to the tenant/seller which offers may be most competitive, most fair, or most unusual. Additionally, the ML model may be trained on past transaction and deal-flow history from the multiple parties, and the intelligent contract system may suggest particular counter-proposals to particular parties based on the past transaction and deal-flow history for that particular land owner/buyer (e.g., past positive interactions with a certain buyer may prompt the intelligent contract system to suggest certain "discounted" terms for a counter-proposal in order to facilitate future positive interactions with that certain buyer).

Figure 3:
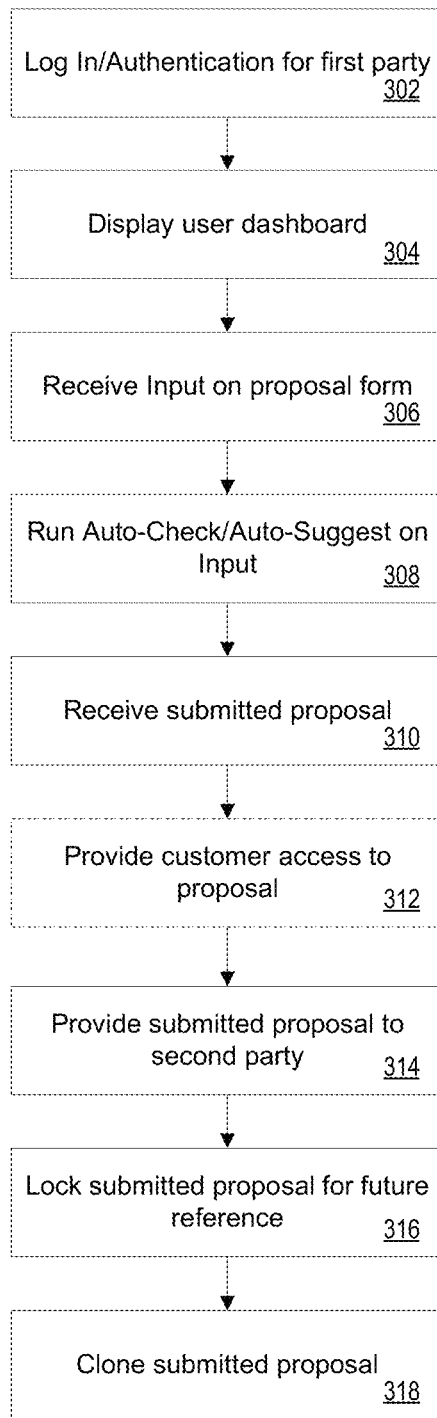
FIG. 3 illustrates an example method for intelligently staging and capturing negotiations from the perspective of a proposal submission, as described herein.

FIG. 3 illustrates an example method for intelligently staging, capturing, and facilitating negotiations from the perspective of a proposal submission, as described herein. The method in FIG. 3 begins at block 302 with log in/authentication for first party. The log in/authentication system may use a standard username/password system or other authentication method(s) (e.g., fingerprint, facial recognition, biometric, two-factor, etc.). The system may store user accounts, where the user may be able to view past deals and transaction history, access signed contracts, report problems, issues or inquiries, as well as negotiations in progress. Upon logging into the system, the method proceeds to step 304 where a user dashboard is displayed. The user dashboard may validate or update contact information, display current negotiations in progress, transaction/deal-flow history, news, and other data. The user may then navigate to a proposal form and fill out a proposal form at step 306, where the system receives input on the proposal form.

During the process of filling out the proposal form at step 306, the intelligent contract system described herein may simultaneously be running an auto-checker/auto-suggestion software that checks the input for potential errors and suggests corrections to those errors. As mentioned previously, a user may input a value (e.g., dollar amount) for the asset that is the subject of negotiation (e.g., rent per month for leasing a certain property location). The dollar amount may be received by the intelligent contract system and compared with comparable asset valuations based on the asset characteristics. For example, regarding a property location, a rent amount per month may be compared to comparable rent prices for similarly situated properties with similar characteristics. If the input rent amount in the proposal form is not proximal to the average rent amounts of similarly situated properties, for example, the system may indicate this discrepancy to the user and suggest a new amount to the user. In some examples, the system may provide automatic calculation suggestions to the negotiating party, such as an automatic calculation of the rent based on square footage or rent per square foot, further in comparison with data related to current market conditions. The user may accept the suggestion or reject it and dismiss the error notification. Similarly, in the context of rent concessions, a user may initially propose 3 months of free rent based on the rent per month and the term of the lease. If a user accidentally input "33" as number of months of free rent, the intelligent contract system described herein may recognize this number as an error through the auto-checker/auto-suggest functionality and flag this error for the user and suggest a more appropriate number ("3").

Once the proposal is completed, the proposal may be submitted to the system for transmission to the other negotiating party. The system receives the submitted proposal at step 310. Additionally, the proposal may optionally be provided to a customer for review or edit at step 312. For example, if the initial party to the negotiations is a broker, the broker may want to share the proposal with his/her client (who may also have a separate account profile within the system). The submitted proposal may automatically be transmitted to the customer account for reference at step 312. In some instances, upon receiving and/or submitting a proposal, a notification may be transmitted to certain designated parties and/or individuals. Notifications may be received in the form of an automatic text message, phone call, push notification through a mobile application, and/or other types of notifications.

Once the system receives the submitted proposal, the system may provide the proposal to a second party at step 314. The second party (e.g., a leasing officer, etc.) may then receive a notification that a new proposal has been received. The new proposal received by the second party may be locked and cloned at steps 316 and 318, where the locked version of the proposal is not editable but displayed to the second party for reference, and the cloned version is editable and may be transformed into a counter-proposal. The cloned version of the proposal may be edited by the user manually. Additionally, the intelligent contract system described herein may provide one or more suggestions to the user for terms to be proposed in the counter-proposal.

The first party and second party may be interchangeable. For instance, when the second party crafts a counter-proposal and transmits it to the first party, the second party is actually now the "first party" in the method described in FIG. 3. When the user begins working in the cloned version of the submitted proposal, the auto-check/auto-suggest functionality from step 308 begins to run in real-time, and intelligent suggestions are provided to the user for the counter-proposal. The counter-proposal is then submitted to the system, and the system receives the counter-proposal at step 310. The system provides the counter-proposal to the first party (just like at 314), where the counter-proposal is then locked and cloned (just like in steps 316 and 318). This process repeats as many times as necessary until the parties to the negotiation reach agreement.

Figure 4:
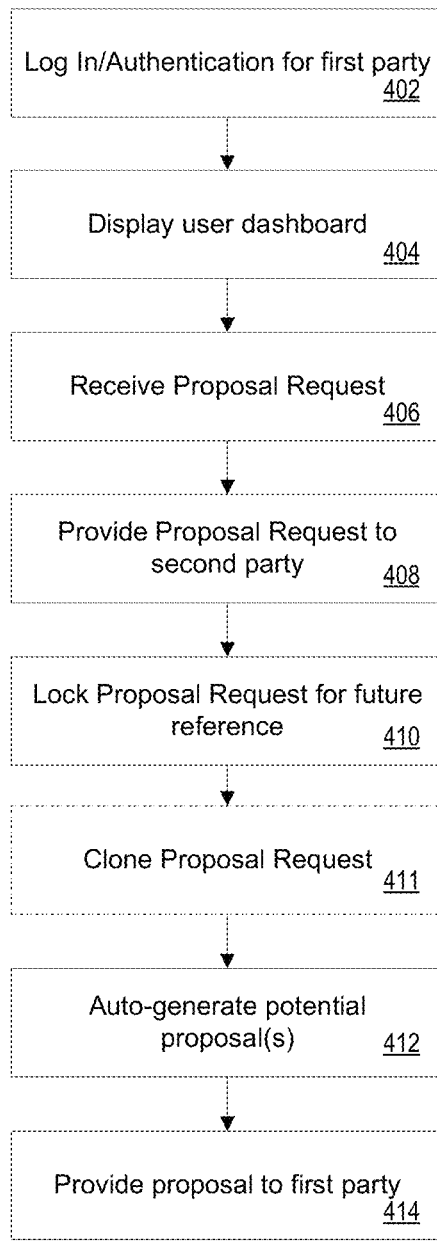
FIG. 4 illustrates an example method for intelligently staging and capturing negotiations from the perspective of a request for proposal submission, as described herein.

FIG. 4 illustrates an example method for intelligently staging, capturing, and facilitating negotiations from the perspective of a request for proposal (RFP) submission, as described herein. Similar to the method described in FIG. 3, a method 400 may begin with a log in/authentication step at block 402. A user dashboard is displayed in step 404. Rather than transmitting a proposal at step 406, the user submits a request for proposal (i.e., requesting the other party to submit an initial proposal). As described earlier, the request for proposal at step 406 may indicate an exact property location, or in some scenarios, the request for proposal may be based on certain criteria (e.g., geography, amenities, size, proximity to POIs, etc.).

In some example aspects, as a user is filling out the request for proposal form, the intelligent contract system described herein may provide intelligent suggestions to the user regarding potential assets of interest. For instance, a user that may be filling out a request for proposal regarding a commercial property lease may receive an intelligent suggestion that suggests the user consider a particular property location that may comport with some of the criteria the user has already inputted into the request for proposal form. Such intelligent suggestions may occur in real-time, as the user is filling out the request for proposal form, or, in other example, the suggestions may be presented after a user submits the request for proposal. In the latter example, a user may then indicate to the system that the user would like to receive a request for proposal on a particular suggested property. This indication may be captured by the system and linked to the user's initial RFP. When the other party views the initial RFP, the other party may view the criteria specified in the RFP along with the specific property location that was intelligently suggested by the system.

Once the request for proposal is completed, the system may receive the proposal request at step 406. The proposal request may then be provided to the second party at step 408. The request may be locked at step 410 and optionally cloned at 411, where the locked version is not editable and stored for reference by the second party, and the cloned version is editable and able to be transformed into a proposal by the second party. The cloning of the request for proposal is optional at step 411 because in some instances, the system may determine that it is more efficient for the second party to start from a blank proposal form than from a cloned RFP form to create the proposal. As such, the cloning of the RFP form is optional at step 411.

The method then proceeds to auto-generate potential proposal suggestions (i.e., intelligent suggestions) based on predictive analytics and/or the trained machine learning model that is trained on e.g., past transaction/deal-flow history related to the first party, similarly situated asset valuations, standard terms given the deal characteristics, current market conditions, future market predictors, etc. The proposals may be provided to the second party, where the second party may either approve or disapprove of the suggestions. The system may receive these approval and disapproval indications as the proposal is crafted. Once the proposal is completed, the proposal may be finalized and provided to the first party at step 414. The system may receive a submission indication from the second party and then subsequently provide the proposal to the first party.

Figure 5:
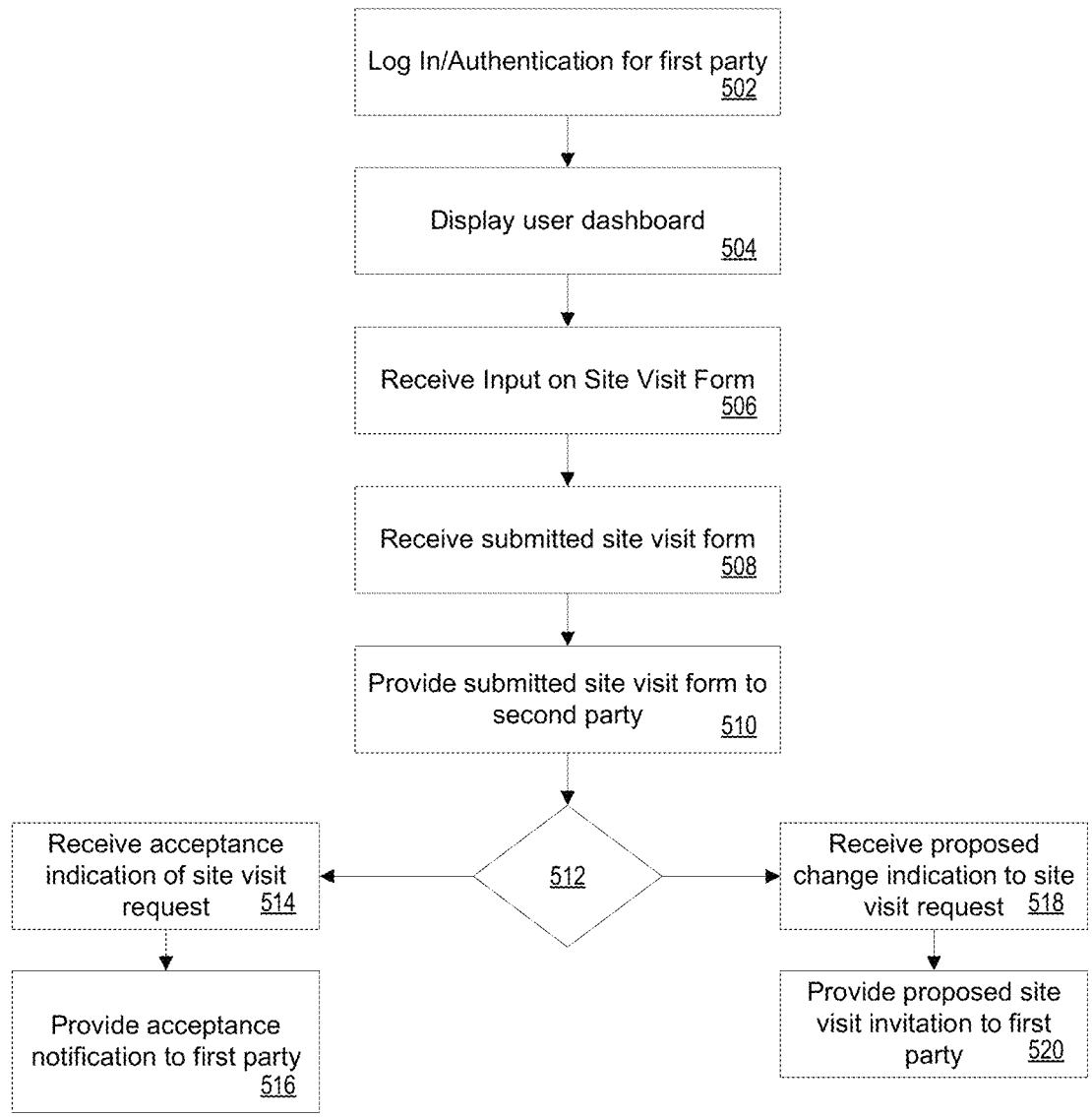
FIG. 5 illustrates an example method for intelligently staging and capturing negotiations from the perspective of a request for site visit, as described herein.

FIG. 5 illustrates an example method for intelligently staging, capturing, and facilitating negotiations from the perspective of a request for site visit, as described herein. The method described in FIG. 5 begins with a log in/authentication step 502. If a user has not yet registered, the system may prompt the user to create an account before proceeding. In other examples, the system may permit the user to proceed without an account. After logging in, the system may display a user dashboard at step 504. The user may then navigate to the Site Visit Form and proceed to fill out the form. The system may receive input related to the site visit form at 506, where the input may include but is not limited to the exact property location, date, time, and contact information. The site visit form may then be completed and submitted to the system. The system receives the completed site visit form at step 508 and subsequently provides the submitted site visit form to the second party at step 510. The system may also automatically generate a calendar event based on the site visit form that may be presented to the first and/or second parties.

The system may also be able to synchronize with the calendars of the first and/or second party. For instance, the first party may begin filling out the site visit form and insert a time and day that conflicts with a previous obligation that is already on the calendar of the first party. The system may cross-check the inputted day and time with the calendar of the first party and provide an intelligent suggestion for a new day and time that does not conflict with previously scheduled events. The same functionality may occur when the second party receives the site visit form.

After the second party receives the site visit form, the second party decides at decision block 512 whether to accept the site visit request or propose a change to the site visit request. If the second party accepts the site visit request, the system will receive an acceptance indication of the site visit request at step 514 and provide the acceptance notification to the first party in step 516. This confirms that both parties have agreed to a site visit on the specified day and time. Alternatively, if the second party rejects the proposed site visit request, the second party may propose a change to the day and time of the site visit or propose a different site altogether (e.g., if the requested site to be visited is unavailable at that day/time, the second party may propose a comparable site). The system may receive the proposed change indication to the site visit request at step 518 and subsequently provide the proposed change to the first party at step 520. The first party may then accept the proposed change or propose a further change. This cycle repeats until the parties can reach a mutually agreeable day and time for the requested site visit.

Figure 6:
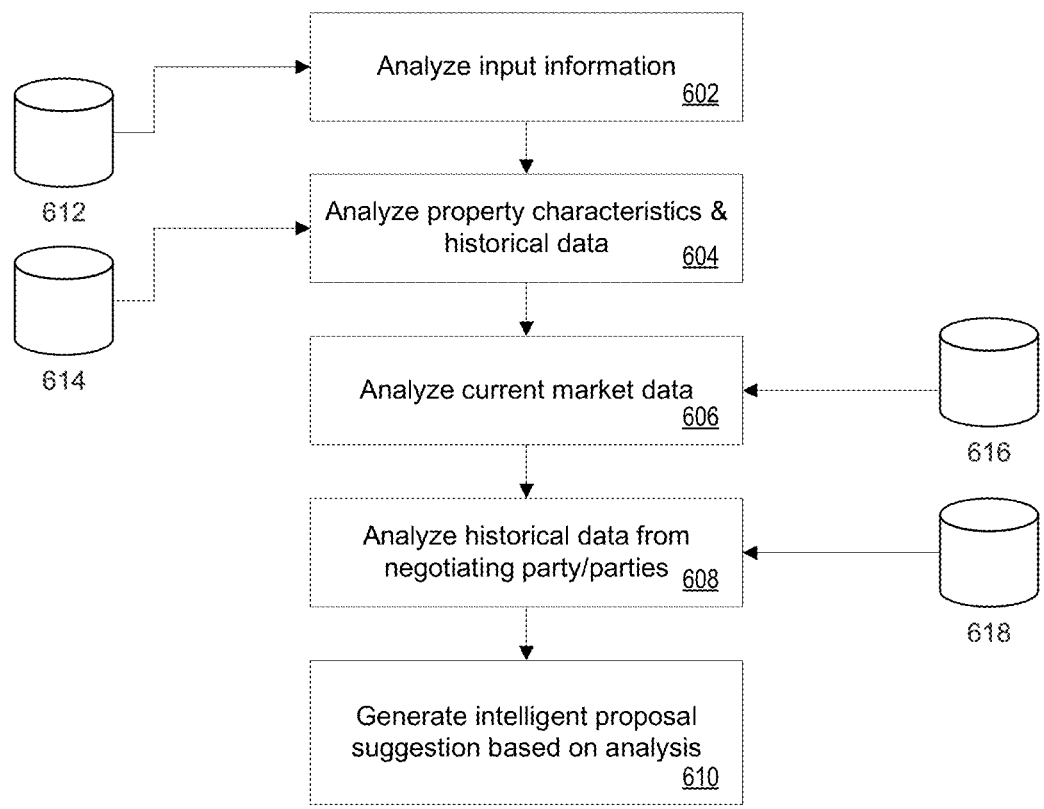
FIG. 6 illustrates an example method for generating an intelligent proposal suggestion, as described herein.

FIG. 6 illustrates an example method for generating an intelligent proposal suggestion, as described herein. The method described in FIG. 6 is based on predictive analytics and/or at least one trained machine learning (ML) model. The ML model(s) may be trained on past transaction/deal-flow history related to the negotiating parties (e.g., negotiation metrics such as behavioral patterns related to the negotiating parties), standard deal terms pre-programmed into the system, current market trends, comparable asset valuations and trends (e.g., based on geography and asset characteristics), current market data, future market forecasts, etc. The ML model(s) may also be trained based on other already-trained ML model(s). A further description of the ML model(s) is provided with respect to the input processor of FIG. 7.

The method of FIG. 6 begins with receiving and analyzing input related to the first party at step 602. The information related to the first party at step 602 may be provided by database 612 and/or real-time input from the first party, e.g., while the first party is providing proposed deal terms in an in-progress proposal form. The method may then proceed to step 604, where the asset characteristics and historical data related to the asset are received and analyzed. This information may be provided to the system via database 614. For example, the asset may be a property location, where the property characteristics may include geographic location, size, amenities, past tenants, maintenance history, proximity to POIs, demographics of the surrounding community, etc. Historical data related to the property location may include the average rent paid for the property over the past ten years, the most recent rent, the most recent rental concession terms (e.g., the number of months of free rent compared to the term duration of the lease), and other historical data that may be relevant to determining intelligent and competitive proposal suggestions. The method may then proceed to analyze current market data at step 606. Current market data may be provided via a third-party data source through database 616 and/or a cloud-based data lake. The current market data may affect certain suggested terms. For instance, if the current market is depressed, where supply is high and demand is low, the intelligent suggestion for the monthly rent for a property location may be lower than average. If the current market data shows a low supply and high demand, then the suggested monthly rent may be higher than average. Another example would be an instance where a property with unique characteristics (e.g., the maximum interior storage height of an industrial building, LEED-ratings, LED lighting fixtures, smart building infrastructure, etc.) in a given geography is being offered for sale. In such an instance, the system may appropriately increase the offering price based on such unique characteristics. Another example would be an adjusted price based on the non-economic terms (e.g., mutual indemnification, representations and warranties) contained in a customer's leasing history.

In some example aspects, the input information received at step 602 may comprise input information related to multiple bids on a particular asset. For instance, a tenant may solicit offers from multiple land owners for a lease, or a seller may solicit offers from multiple buyers. In such a scenario where multiple proposals are submitted for a particular asset, the intelligent contract system may receive the multiple proposals, analyze the multiple proposals, and compare the proposals amongst one another, as well as historical information and data (step 604). Current market data and historical data from the interested parties (e.g., land owners, interested buyers, etc.) may be analyzed and compared against the submitted proposals. Based on the comparison data among the different proposals and the comparison data with the historical characteristics of the asset, current market data, historical data related to the proposing parties, and other relevant data, the intelligent contract system described herein may provide a recommendation to the tenant/seller as to which proposal may be most advantageous. The tenant/seller may be able to input preferences and constraints into the system, wherein the system receives such inputs (e.g., tenant/seller values a bona fide buyer with a legitimate transaction history vs. a lower price from a buyer with no historical data). The system may consider the inputs, and based on the inputs, provide intelligent suggestions as to which proposal may comport best with the negotiating party's preferences. In some examples, the system may display the multiple offers in a ranking system based on certain criteria (e.g., price, track-record, rent concessions, etc.).

In another example aspect, a certain user preference may relate to a contract provision and the contract provision's associated risk level. For instance, the ranking of proposals may be based on the level of risk of certain contract provisions (e.g., indemnification, delivery date deadlines, liquidated damages, penalties, force majeure, etc.). The intelligent contract system may analyze the proposed contract terms, compare the proposed contract terms among other terms from the multiple offers and/or against standard contract terms (e.g., stored in databases 614, 616, etc.), and subsequently provide a risk assessment to the user related to a specific contract provision/proposed term.

The method may then proceed to analyze the historical transactional and deal-flow history from the parties to the negotiation at step 608. This data may be stored at and provided from database 618 to the system. The historical data from the first and second party may be evaluated to extract intelligent patterns, trends, and preferences. For instance, a certain party may typically be willing to negotiate on number of months of free rent in exchange for a longer-term duration but not typically willing to negotiate on the rent. Such a profile of a party may prompt the system to provide an intelligent suggestion to the other party to propose different terms for the number of months of free rent and term duration rather than a change to the rent. In another example, a certain negotiating party may prefer unique perks as opposed to negotiating directly on the rent, term, and number of months of free rent. Such a profile may prompt the system to intelligently suggest to the other negotiating party to consider adding in additional perks to the proposal (e.g., employee access to gym facilities, updated furniture, covered parking spots, etc.) rather than adjusting the rent, duration, and/or rent concession terms. In yet another example, a certain negotiating party may prefer to negotiate a lower purchase price with a low monthly rent on a sale leaseback transaction for a longer lease term as opposed to a high purchase price with a higher monthly rent on a sale leaseback transaction.

Once the system has analyzed the data from steps 602 through 608, the system may generate an intelligent proposal suggestion to a party at step 610. The intelligent proposal suggestion may be approved or rejected by the party. The system may receive the approval or rejection indication from the party, store that indication, and use it to train the ML model(s) for future intelligent suggestions. For example, if a certain user consistently rejects intelligent suggestions related to changing the monthly rent, the system may determine that the particular party does not typically negotiate on monthly rent, and in the future, the system may provide intelligent suggestions that do not alter the monthly rent of a property location.

Databases 612, 614, 616, and 618 may either be parts of a single database or separate discrete databases. In some examples, the system may be configured to host separate and discrete databases for added security and redundancy, but in other examples, the system may be configured to host the data that is analyzed in steps 602-608 in a single database for increased usability and maintenance.

In another example aspect, the negotiation flow may be applied to an actual lease agreement. Once general terms have been agreed to among the negotiating parties (e.g., based on a letter of intent), a fully-integrated contract is usually the next step. The actual contract itself may be loaded into the intelligent contract system and submitted by one party as a "first proposal." The contract may then be the subject of the negotiations, where each change is captured in the system (e.g., locked and cloned). Certain provisions may be analyzed by the intelligent contract system and flagged to the user based on the user's risk profile. Other provisions may be flagged as unusual terms that are not normal based on the characteristics of the contract and asset at issue. Once the negotiating parties have both mutually agreed on the contract, both parties may agree within the system, thereby creating a fully integrated contract.

In the context of finalizing a lease document between two parties, the system may use market information and prior finalized leases between the parties or their affiliates to intelligently populate the lease document with terms and conditions that may be non-customary but which the parties may find desirable or otherwise acceptable.

Figure 7:
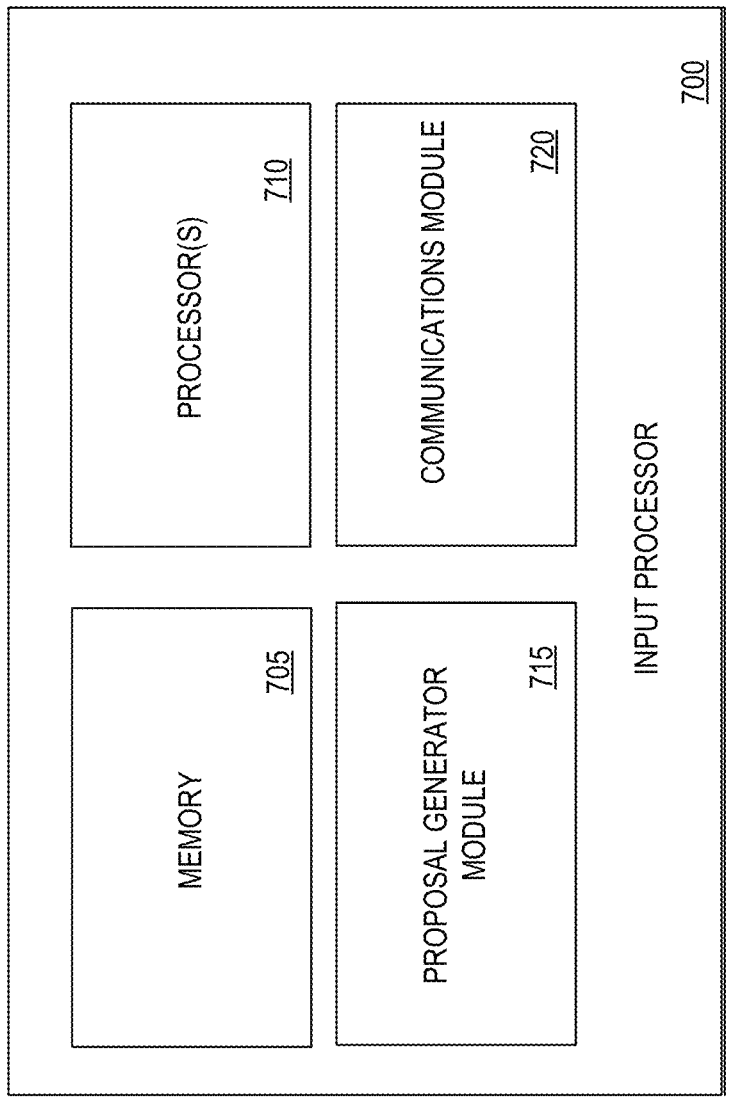
FIG. 7 illustrates an example input processor for implementing systems and methods for intelligently staging and capturing negotiations, as described herein.

FIG. 7 illustrates an example input processor for implementing systems and methods for intelligently staging, capturing, and facilitating negotiations, as described herein. Input processing system 700 may be embedded within a client device (E.g., client devices 102, 104, and/or 106), remote web server device (E.g., devices 116, 118, and/or 120), and other devices capable of implementing systems and methods for intelligently staging, capturing, and facilitating negotiations. The input processing system contains one or more data processors and is capable of executing algorithms, software routines, and/or instructions based on processing data provided by a variety of sources related to negotiations, transaction history, current market trends, future market predictors, and asset valuations (e.g., intelligently via an ML algorithm and/or manually by a user). The input processing system can be a factory-fitted system or an add-on unit to a particular device. Furthermore, the input processing system can be a general-purpose computer or a dedicated, special-purpose computer. No limitations are imposed on the location of the input processing system relative to a client or remote web server device, etc. According to embodiments shown in FIG. 7, the disclosed system can include memory 705, one or more processors 710, proposal generator module 715, and communications module 720. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 705 can store instructions for running one or more applications or modules on processor(s) 710. For example, memory 705 could be used in one or more embodiments to house all or some of the instructions needed to execute the functionality of proposal generator module 715 and communications module 720. Generally, memory 705 can include any device, mechanism, or populated data structure used for storing information. In accordance with some embodiments of the present disclosures, memory 705 can encompass, but is not limited to, any type of volatile memory, nonvolatile memory, and dynamic memory. For example, memory 705 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 705 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 705.

Proposal Generator Module 715 may be configured to run a portion of the operation steps described in FIGS. 2-6, particularly the steps of analyzing data and generating intelligent suggestions related to proposals and counter-proposals. Module 715 may receive data from various sources, as described in FIG. 6. The data may be processed, analyzed, and used to train at least one ML model that may be contained within proposal generator module 715. It should be appreciated that proposal generator module 715 is configured to communicate with communications module 720, where communications module 720 may provide at least one intelligent suggestion to a negotiating party. In some examples, the proposal generator module 715 may be built on the server-side and execute functions using built-in calculations (e.g., pre-programmed lease economic calculations).

Proposal generator module 715 may contain at least one predictive analytics or machine-learning (ML) engine that comprises at least one machine-learning model. The ML engine may be configured to receive user transaction/deal-flow history, other user profile data, comparable asset valuation data, current market data, future market indicator data, standard deal terms based on current deal characteristics, etc., to train at least one machine-learning model or compare against an already-trained machine-learning model. For example, to train the ML model(s), the extracted features of the input data may be associated with specific asset identifiers (e.g., geographic location, size, amenities, proximity to POIs, price, etc.). The ML engine may utilize various machine learning algorithms to train the ML model, including but not limited to linear regression, logistic regression, linear discriminant analysis, classification and regression trees, naïve Bayes, k-Nearest neighbors, learning vector quantization, neural networks, support vector machines (SVM), bagging and random forest, and/or boosting and AdaBoost, among other supervised and unsupervised machine learning algorithms. The aforementioned machine learning algorithms may also be applied when comparing input data to an already-trained machine learning model. Based on the identified and extracted features and patterns (e.g., related to individual negotiating parties, property locations, standard deal terms, etc.), the ML engine may select the appropriate machine learning algorithm to apply to the features to train the at least one machine learning model. For example, if the received input data are complex and demonstrate non-linear relationships, then the ML engine may select a bagging and random forest algorithm to train the machine learning model. However, if the received features demonstrate a linear relationship to certain features and input data (e.g., price per month of rent for a property location increases as distance to an international airport decreases), then the ML engine may apply a linear or logistic regression algorithm to train the machine learning model.

In other aspects, the ML engine may apply at least one already-trained machine learning model and/or predictive analytics to the received input features from the past user transaction/deal-flow history and other user profile data to detect previously identified and extracted data points and preferences (e.g., certain negotiating parties prefer to negotiate on some terms but not others; which terms are most important to one party may not be as important to another party) and previously recognized patterns (e.g., party A will rarely come down on price per month for property locations within X geographic location and with at least Y square units in size, but party A will negotiate rent concessions based on duration of lease for the same property locations). The ML engine may be configured to compare at least one trained machine learning model to the received input data to generate comparison results that indicate which intelligent suggestions should be provided to a user during the formation of a proposal and/or counter-proposal. Specifically, the ML engine may compare the identified and extracted features from a user's past transaction/deal-flow history that are associated with specific property characteristics. The ML engine is also configured to generate comparison results, indicating the similarity (or lack thereof) between certain assets (that are the subject of the negotiations). In other aspects, the comparison results may include a suggestion score, which may indicate how confident the system may be that a candidate intelligent suggestion is relevant to the user and/or how confident the intelligent suggestion will expedite the negotiation process and allow the parties to reach mutual agreement. For instance, based on a user's past transaction/deal-flow history and other user profile data, a suggestion score may be assigned to certain candidate intelligent suggestions that may be provided to the user during a proposal/counter-proposal cycle. The candidate intelligent suggestions that are scored above a certain threshold may be provided to the user at a certain point in the negotiation cycle, whereas those below the threshold may not be provided (e.g., suggestions with scores of "7" or higher may be provided, but suggestions with scores of "6" or below may not be provided). It should be appreciated that the ML engine embedded within proposal generator module 715 may be its own separate and discrete module within the input processor 700, in some examples. The ML engine may be configured to communicate with communications module 720. In particular, the ML engine may transmit intelligent contract suggestions based on the results of at least one machine-learning algorithm process, as described in FIG. 6, for example.

Communications module 720 is associated with sending/receiving information (e.g., collected and classified by the proposal generator module 715, commands received via client devices or server devices, etc.) with other client devices, remote web servers, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 720 sends information received by proposal generator module 515 to client devices 102, 104, and/or 106, as well as memory 705 to be stored for future use. In some examples, communications modules may be constructed on the HTTP protocol through a secure REST server(s) using RESTful services.

In other embodiments, input processing system 700 may be designed in a multi-state configuration and include more than one machine learning and/or predictive analytics engine. In embodiments, a first machine learning engine may be trained to recognize one type of data entity (e.g., transaction/deal-flow history, negotiating party behavior, property characteristics, current market data, future market indicators, etc.), and a second machine learning engine may be trained to recognize another type of data entity. For example, one machine learning engine may be trained to recognize particular property characteristics based on analyses of similarly-situated property locations. Another machine learning engine may be trained to recognize certain negotiating styles from analyses of past transaction/deal-flow history of a group of similarly-situated negotiating parties. In other aspects, multiple machine learning engines may be distributed within the input processing system 700. A multi-state configuration allows for multiple machine learning and/or predictive analytics engines to process data simultaneously, thereby increasing processing power and speed, which may translate to more accurate and relevant intelligent contract suggestions, leading to quicker and more efficient mutually-agreeable deals. The comparison results generated by each machine learning and/or predictive analytics engine in a multi-state configuration may be aggregated prior to determining exactly which candidate intelligent contract suggestions should be provided to a user.

Figure 8:
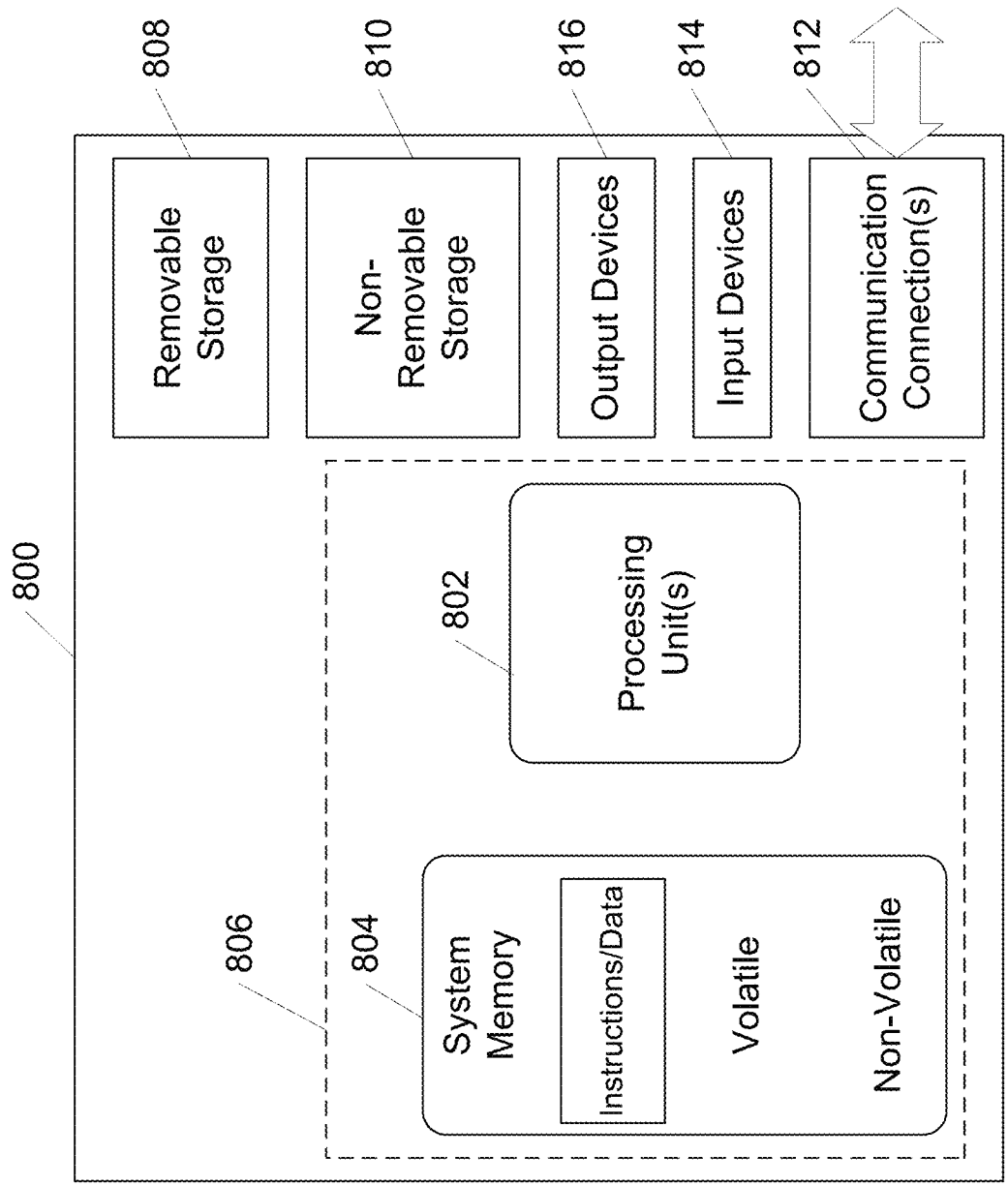
FIG. 8 illustrates one example of a suitable operating environment in which one or more of the present embodiments may be implemented.

FIG. 8 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 8 by dashed line 806. Further, environment 800 may also include storage devices (removable, 808, and/or non-removable, 88) including, but not limited to, magnetic or optical disks or tape. Similarly, environment 800 may also have input device(s) 814 such as keyboard, mouse, pen, voice input, etc. and/or output device(s) 816 such as a display, speakers, printer, etc. Also included in the environment may be one or more communication connections, 812, such as LAN, WAN, point to point, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 800 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A client device for intelligently staging negotiations, comprising:
   a memory configured to store non-transitory computer readable instructions; and
   a processor communicatively coupled to the memory, wherein the processor, when executing the non-transitory computer readable instructions, is configured to:
      receive, from a server, a copy of a machine-learning model trained on a dataset of preferences from a first party and a second party,
         wherein the machine-learning model is deployed on the server for use by the client device when the client device is connected to the server, and
         wherein the dataset of preferences comprises a transaction history related to the first party and a transaction history related to the second party;
      configure the copy of the machine-learning model for use by the client device when the client device lacks a connection to the server;
      cache the copy of the machine-learning model locally on the client device;
      receive a first proposal from the first party;
      lock the first proposal;
      generate a clone of the first proposal, wherein the clone of the first proposal is editable by the second party;
      receive at least one edit to the clone of the first proposal from the second party;
      receive current market data related to the first proposal;
      input the at least one edit and the current market data related to the first proposal to the copy of the machine-learning model cached on the client device when the client device lacks the connection to the server;
      compare the at least one edit and the current market data to the dataset of preferences from the first party and the second party;
      based on comparing the at least one edit and the current market data to the dataset, update the machine-learning model deployed on the server when the client device is connected to the server;
      based on the update of the machine-learning model on the server, generate at least one counter-proposal suggestion;
      receive an approval indication of the at least one counter-proposal suggestion, wherein the approval indication transforms the at least one counter-proposal suggestion into the counter-proposal; and
      transmit the counter-proposal to the first party.

2. The client device of claim 1, wherein the first proposal from the first party is related to at least one property characteristic.

3. The client device of claim 2, wherein the processor is further configured to analyze data related to the at least one property characteristic, wherein the at least one property characteristic comprises at least one of: a geographic location, a size, a price, a term, a duration, a distance from at least one point-of-interest, and a commencement date.

4. The client device of claim 3, wherein the data related to the at least one property characteristic comprises comparison data from at least one similarly-situated property location, wherein the comparison data comprises at least one of: a geographic location, a size, a price, a term duration, a rent concession, a distance form at least one point-of-interest, and facilities information.

5. The client device of claim 1, wherein the processor is further configured to receive at least one edit to the at least one counter-proposal suggestion.

6. The client device of claim 5, wherein the processor is further configured to generate a second counter-proposal suggestion based on the at least one edit to the at least one counter-proposal suggestion.

7. The client device of claim 1, wherein the processor is further configured to lock the counter-proposal, wherein the locked version is configured for transmission to at least one of: the second party and a third party.

8. The client device of claim 7, wherein the locked version of the at least one counter-proposal is provided to the first party simultaneously with at least one cloned version of the at least one counter-proposal, wherein the at least one cloned version is editable.

9. The client device of claim 1, wherein the processor is further configured to:
   receive a plurality of proposals;
   analyze the plurality of proposals, wherein analyzing the plurality of proposals comprises comparing the plurality of proposals with at least one preference associated with the second party; and
   rank the plurality of proposals based on the at least one preference associated with the second party.

10. The client device of claim 1, wherein the transaction history related to the first party and the transaction history related to the second party comprises at least one negotiation metric.

11. The client device of claim 1, wherein the processor is further configured to display at least one change indicator, wherein the at least one change indicator indicates a change between the first proposal and the at least one counter-proposal.

12. A computer-readable media storing non-transitory computer executable instructions that when executed cause a computing system to perform a method for intelligently staging negotiations comprising:
   receiving, from a server, a copy of a machine-learning model trained on a dataset of preferences from a first party and a second party, wherein the machine-learning model is deployed on the server for use by a client device when the client device is connected to the server, and wherein the dataset of preferences comprises a transaction history related to the first party and a transaction history related to the second party;

configuring the copy of the machine-learning model for use by the client device when the client device lacks a connection to the server;

caching the copy of the machine-learning model locally on the client device;

receiving a proposal from the first party, wherein the proposal is related to at least one property location;

locking the proposal from the first party;

generating a clone of the proposal, wherein the clone of the proposal is editable by the second party;

receiving at least one edit to the clone of the proposal from the second party;

receiving current market data related to the proposal;

inputting the at least one edit and the current market data related to the proposal to the copy of the machine-learning model cached on the client device when the client device lacks the connection to the server;

comparing the at least one edit and the current market data to the dataset of preferences from the first party and the second party;

based on comparing the at least one edit and the current market data to the dataset, updating the machine-learning model deployed on the server when the client device is connected to the server;

based on the update to the machine-learning model on the server, generating at least one proposal suggestion;

transforming the at least one proposal suggestion into the counter-proposal; and providing the counter-proposal to the first party.

13. The computer-readable media of claim 12, wherein the first proposal from the first party is related to at least one property characteristic.

14. The computer-readable media of claim 13, wherein the method comprises:

analyzing data related to the at least one property characteristic, wherein the at least one property characteristic comprises at least one of: a geographic location, a size, a price, a term, a duration, a distance from at least one point-of-interest, and a commencement date.

15. The computer-readable media of claim 14, wherein the data related to the at least one property characteristic comprises comparison data from at least one similarly-situated property location, wherein the comparison data comprises at least one of: a geographic location, a size, a price, a term duration, a rent concession, a distance form at least one point-of-interest, and facilities information.

16. The computer-readable media of claim 12, wherein the method comprises:

receiving at least one edit to the at least one counter-proposal suggestion.

17. The computer-readable media of claim 16, wherein the method comprises:

generating a second counter-proposal suggestion based on the at least one edit to the at least one counter-proposal suggestion.

18. The computer-readable media of claim 12, wherein the method comprises:

locking the counter-proposal, wherein the locked version is configured for transmission to at least one of: the second party and a third party.

19. The computer-readable media of claim 18, wherein the locked version of the counter-proposal is provided to the first party simultaneously with at least one cloned version of the counter-proposal, wherein the at least one cloned version is editable.

20. The computer-readable media of claim 12, wherein the method comprises:

receiving a plurality of proposals;

analyzing the plurality of proposals, wherein analyzing the plurality of proposals comprises comparing the plurality of proposals with at least one preference associated with the second party; and ranking the plurality of proposals based on the at least one preference associated with the second party.

* * * * *